United States Patent [19]
Stephenson et al.

[11] Patent Number: 6,119,000
[45] Date of Patent: Sep. 12, 2000

[54] METHOD AND APPARATUS FOR TRACKING IDENTITY-CODE CHANGES IN A COMMUNICATIONS SYSTEM

[75] Inventors: David Arthur Stephenson, Chippenham; David Bonner, East Kilbride; Jan Schiefer, Bristol; Steven Nicholas Bennett, Charlton Kings, all of United Kingdom

[73] Assignee: Hewlett-Packard Company, Palo Alto, Calif.

[21] Appl. No.: 08/851,041

[22] Filed: May 5, 1997

[30] Foreign Application Priority Data

May 3, 1996 [EP] European Pat. Off. .......... 96 3 03 147

[51] Int. Cl.[7] ..................................................... H04Q 7/00
[52] U.S. Cl. ........................... 455/432; 455/435; 455/456
[58] Field of Search ..................... 455/456, 422, 455/432, 433, 435, 517

[56] References Cited

U.S. PATENT DOCUMENTS

| | | | |
|---|---|---|---|
| 5,561,840 | 10/1996 | Alvesalo et al. | 455/456 |
| 5,734,699 | 3/1998 | Lu et al. | 455/422 |
| 5,818,824 | 10/1998 | Lu et al. | 370/328 |
| 5,854,982 | 12/1998 | Chambers et al. | 455/432 |

FOREIGN PATENT DOCUMENTS 0710043  10/1994  European Pat. Off. .

OTHER PUBLICATIONS

European Search Report—EP–96–30–3147.
"GSM Signalisierung in der Praxis" XP000534209, 11450 ITG Specialist Report, Sep. 1993, No. 124, pp. 423–432, Berlin, Germany, with English Translation.

*Primary Examiner*—Doris H. To
*Assistant Examiner*—Thomas B. Ahn

[57] ABSTRACT

In a mobile radio network such a GSM network, an operative identity code is passed by a mobile station to the fixed network part at the start of each communication transaction. This operative identity code will either be the unique identity code (IMSI) assigned to the mobile-station user or, more usually, a temporary, substitute, identity code (TMSI) allocated by the fixed network part with a view to obscuring the identity of the user to anyone monitoring the network radio traffic. Whilst the fixed network infrastructure knows the association between a temporary identity code (TMSI) and the corresponding unique identity code (IMSI) of a user, this information is generally not readily accessible. To enable the current temporary identity code (TMSI) of a user to be readily tracked without burdening the network infrastructure, a monitoring arrangement is provided which monitors network signalling messages to link the different messages associated with a particular user mobile station that separately give the current operative identity code (line "c") and assign a successor operative identity code to that user (line "h"). In one embodiment applicable to a GSM network, messages on the A interface that carry identity code information for a particular user during a communication transaction are linked through the local references of the SCCP connection established for the transaction. In a second embodiment, also applicable to GSM, messages on the Abis interface are monitored and linked through the channel numbers contained in these messages.

19 Claims, 9 Drawing Sheets

FIG. 3A
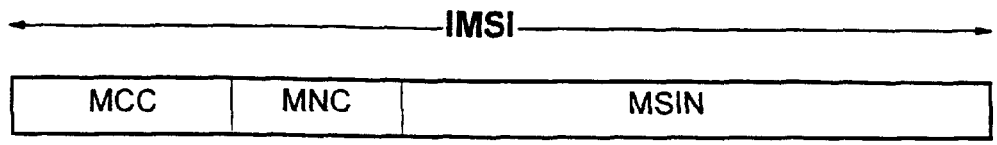
FIG. 3B
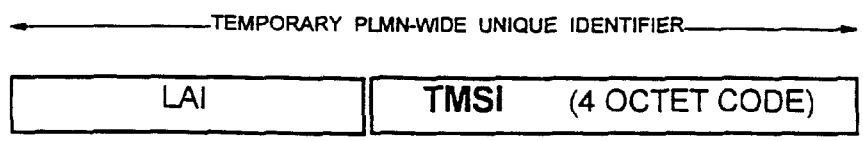
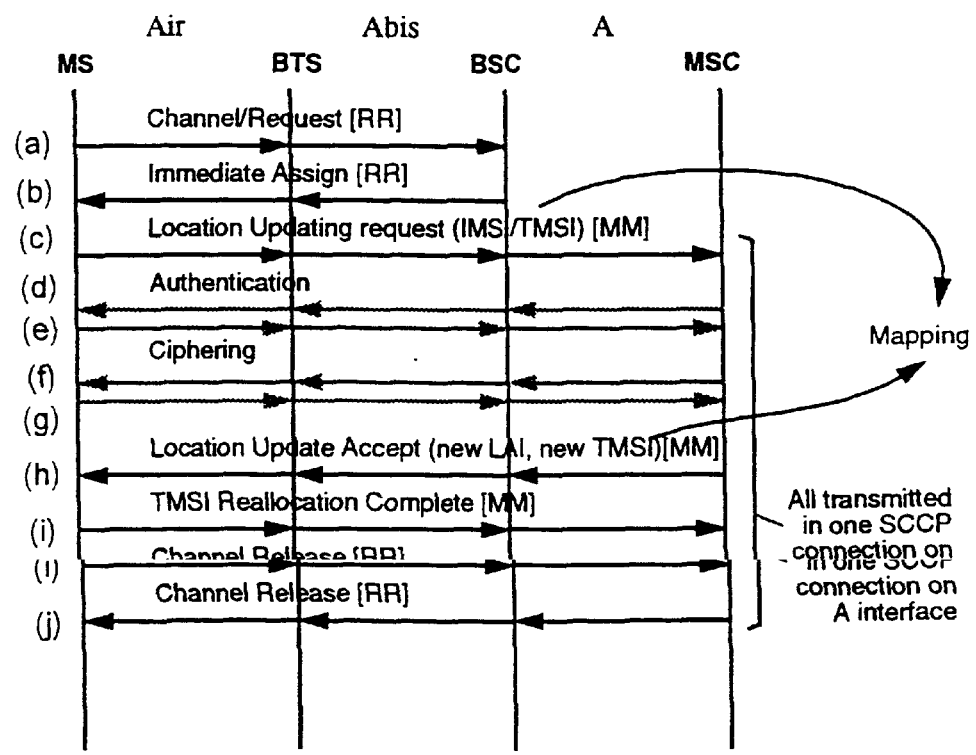
FIG. 4

METHOD AND APPARATUS FOR TRACKING IDENTITY-CODE CHANGES IN A COMMUNICATIONS SYSTEM

TECHNICAL FIELD

The present invention relates to a method and apparatus for tracking identity-code changes in a communications system; in particular, but not exclusively, the present invention relates to the tracking of changes in operative subscriber identity codes in mobile radio systems such as systems operating according to the GSM, DCS1800 or PCS 1900 standards.

For convenience, systems operating according to the GSM and DCS1800 standards, including derivatives thereof, will hereinafter be referred to as "GSM-type" systems, DCS1800 systems themselves being derivative of GSM systems and exhibiting the same characteristics for present purposes; it should, however, be noted that the present invention is not restricted to GSM-type systems.

BACKGROUND ART

In mobile radio networks, an operative identity code is generally passed by a mobile station to the fixed network part at the start of each communication transaction. This operative identity code generally identifies the user to the network and for this purpose, each user is assigned a unique identity code. However, it is undesirable to have all the transactions of a user marked by the user's unique identity code since this permits the user's activity to be monitored by listening to the network radio traffic. For this reason, temporary identity codes are allocated to users by the fixed network part, the fixed network part being itself aware of the association between the temporary and unique identity codes of a user; the temporary identity code is then used by a user's mobile station as its operative identity code when initiating a transaction.

In principle, it should be a simple matter for the network operator to ascertain the current operative identity code being used by a user as the network infrastructure is already aware of the association. However, as a practical matter, accessing the information held in the network infrastructure for non-standard purposes requires substantial modification to existing software with the consequent need to re-qualify the software and associated systems.

It is therefore an object of the present invention to provide an alternative way of tracking the current operative user identity of a particular user.

As will be more fully set out below, the present invention involves providing a monitoring method and apparatus that derives the sought-after information by monitoring signalling messages on the network rather than by accessing data stored in the network infrastructure. Monitoring signalling messages to derive information on a mobile network is not new in itself and may be done using, for example, the Hewlett-Packard 37900D Signalling Test Set. However, not only is it previously unknown to seek to ascertain the current operative identity code being used for a user by monitoring network signalling messages, but the required information to track the current operative identity code is generally not contained in an individual messages but is spread across different messages.

SUMMARY OF THE INVENTION

According to one aspect of the present invention, there is provided a method of tracking identity-code changes in a communications system in which a plurality of user stations can simultaneously conduct respective communication transactions during which signalling messages are exchanged with the remainder of the communication system over at least one signalling path of a signalling subsystem of said communications system, said signalling messages including first messages sent by said user stations and each including an identity code associated with the user station sending that message, and second messages specifying corresponding identity codes for particular user stations; said method comprising the steps of:

(a) monitoring said signalling subsystem to detect a said first message;

(b) extracting from the said first message detected in step (a), the said identity code included therein;

(c) further monitoring said signalling subsystem to detect a said second message related to the same communication transaction as the first message detected in step (a); and (d) upon detection in step (c) of said second message, recording the identity code specified therein as the identity code corresponding to the identity code extracted in step (b).

Typically, the communications system will be a mobile radio network in which users have respective unique identity codes and the user stations are mobile stations that communicate over radio channels with a fixed network part forming the aforesaid remainder of the communications system. In this case, the identity code included in a said first message will generally be one of (i) the unique identity code of a user associated with the user station sending that first message, and (ii) a temporary identity code assigned by a said second message sent to the user station. The mobile stations (e.g. user handsets) may also have respective unique identity codes, in which case one of the identity codes included in the first and second messages may be the respective unique identity code for a mobile station.

Generally, step (c) will involve detecting signalling messages relating to the said same communication transaction by looking on a specific signalling path for signalling messages that have at least one particular parameter value which is at least temporarily characteristic of said same communication transaction on the aforesaid specific signalling path.

The said specific signalling path will at least initially be the signalling path on which said first message is detected in step (a); however, the signalling path being used in relation to the said same transaction may change during the course of the transaction and the present monitoring method is preferably operative to detect such changes and set the said specific signalling path accordingly.

As regards the said at least one particular parameter value, this is advantageously determined from at least one signalling message previously detected on the specific signalling path as related to said same communication transaction. Thus, in the case of a GSM mobile radio system being monitored on its A interfaces, said at least one particular parameter value can be the end point reference of the SCCP connection set up for the communication transaction on said specific signalling path; in this case, the said at least one particular parameter value remains the same for as long as said specific signalling path is unchanged. For a GSM system being monitored on its Abis interfaces, said at least one particular parameter value can be the channel number of the radio channel being used for the transaction; however, this value may be changed during the transaction and preferably, therefore, the present monitoring method is arranged to track such changes and adjust the said at least one parameter value accordingly.

Preferably, the monitoring method includes the step of generating a record for said specific signalling path associating the identity code extracted in step (a) with the current said at least one parameter value characteristic of said same communication transaction on said specific signalling path, step (d) involving associating the identity code specified in the second message with the record. In this case, the method advantageously also includes the further step of monitoring said specific signalling path to detect termination of said same communication transaction and thereupon removing said record.

Generally, the monitored signalling subsystem will have a plurality of said signalling paths and in this case, the monitoring method preferably involves carrying out steps (a) and (c) by monitoring at least some of these signalling paths, and the operation in step (d) of recording said identity code corresponding to the identity code extracted in step (b), preferably involves generating a report including both these identity codes and sending this report to a station, this station being the same for all monitored signalling paths.

Preferably, the operation in step (d) of recording the identity code corresponding to the identity code extracted in step (b), involves using these identity codes to maintain association means, such as a lookup table, associating the corresponding current identity codes with unique subscriber identities.

Where the monitored communications system is a mobile radio network that extends over a plurality of location areas with temporary identity codes being assigned uniquely within each such area, the method preferably includes the step of monitoring said signalling path to identify the current location area of the user stations partaking in communication transactions, and recording the location area of a user station along with its identity code.

Tracking the current identity code of a particular user to whom a unique identity code has been assigned, enables the usage behaviour of that user to be monitored by the following steps:
(i) tracking identity-code changes in accordance with the embodiment of the invention that maintains an association between the unique identity code of a user and the corresponding current identity code;
(ii) starting with the said unique identity code of said particular user, identifying from said association means the corresponding current identity code of that user; and
(iii) monitoring said signalling path (or paths) to detect first messages including the said corresponding current identity code identified in step (ii), and recording predetermined parameters of the communication transactions of which these first messages form a part.

According to another aspect of the present invention, there is provided apparatus for tracking identity-code changes in a communications system in which a plurality of user stations can simultaneously conduct respective communication transactions during which signalling messages are exchanged with the remainder of the communication system over at least one signalling path of a signalling subsystem of said communications system, said signalling messages including first messages sent by said user stations and each including an identity code associated with the user station sending that message, and second messages specifying corresponding identity codes for particular user stations; said apparatus comprising:
first monitoring means for monitoring said signalling subsystem to detect a said first message;
first extracting means for extracting from a said first message detected by said first monitoring means, the said identity code included therein,
second monitoring means for further monitoring said signalling subsystem to detect a said second message related to the same communication transaction as said first message detected by said first extracting means, and
second extracting means for extracting from a said second message detected by said second monitoring means, the identity code specified in that second message as the identity code corresponding to the identity code extracted by the first extraction means.

It will be appreciated that the first and second monitoring means will generally use the same physical elements for listening to the signalling subsystem.

BRIEF DESCRIPTION OF DRAWINGS

A method and apparatus for tracking identity-code changes in accordance with the present invention, will now be described, by way of non-limiting example, with reference to the accompanying drawings, in which:

FIG. 3A is a diagram illustrating the format of an IMSI subscriber identity code;

FIG. 3B is a diagram illustrating the format of a TMSI-based subscriber identity code;

FIG. 4 is a diagram illustrating the signalling messages passed between a mobile station and an MSC of the FIG. 1 system during a location update procedure;

BEST MODE FOR CARRYING OUT THE INVENTION

Overview of a GSM Network

Figure 1:
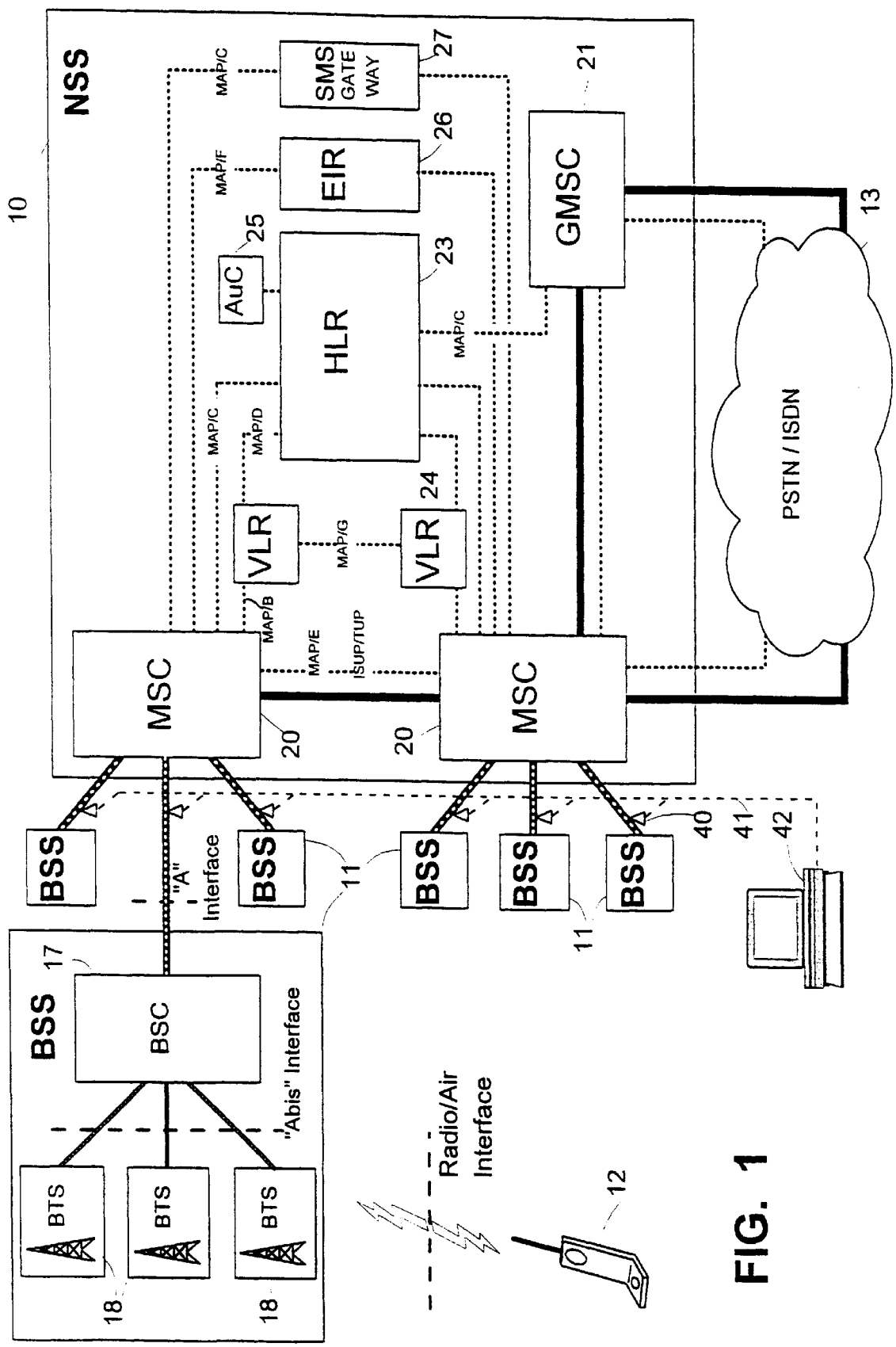
FIG. 1 is a block diagram showing the main components of a GSM cellular mobile radio system.

FIG. 1 is a diagram showing the main elements of a public land mobile network (PLMN) based on digital cellular radio technology; in particular, the FIG. 1 network is a GSM network.

The FIG. 1 network comprises a network and switching subsystem (NSS) 10 which connects with a plurality of base station subsystems (BSS) 11; the BSS provide radio communication with mobile stations 12 (only one of which is shown in FIG. 1). The NSS 10 also communicates with the fixed public network 13 (the public switched telephone network PSTN and integrated digital services network ISDN). Indeed the PLMN can be thought of as an access path to the PSTN/ISDN, though calls may also be wholly contained within the PLMN.

Each BSS 11 comprises a base station controller (BSC) 17, and a plurality of base transceiver stations (BTS) 18 each controlled by the BSC 17. Each BTS 18 has radio transmitters and receivers for providing radio coverage of a local area known as a 'cell'.

Signalling and user data (digitised voice and other digital data such as computer data) pass between each mobile station 12 and the BTS 18 of the cell in which the mobile station is located. As a mobile station moves from one cell to another, control of handover of communication with the mobile station from the BTS of the old cell to the BTS of the new cell, is effected by the BSC.

The radio interface between a mobile station and BTS is standardised within a particular system such as GSM. Similarly, the interface between each BTS 18 and its associated BSC 17, by which user data and signalling are exchanged between these elements, is also generally standardised (in GSM, this interface is known as the 'Abis' interface).

Each BSS 11 communicates with a mobile switching centre (MSC) 20 of the NSS 10, each MSC 20 generally being in communication with several BSS. The interface between a BSS and an MSC is again generally standardised, this interface being known as the 'A' interface in GSM.

In GSM networks, user data and signalling are multiplexed across the radio interface, the 'Abis' interface and the 'A' Interface. However, within the NSS, user data and signalling are handled separately. This is shown in FIG. 1 by depicting user-data paths in solid lines and signalling paths in dotted lines; when both use the same path, a solid line with superimposed white dots is used.

In the NSS, the user data is handled by the MSCs and for a given call, the user data will commonly traverse two MSCs 20. Although in FIG. 1 the MSCs 20 are shown as directly connected by a solid line, this should be understood merely as showing that user-data traffic can pass between the MSCs; in practice, whilst a direct connection is used where justified by traffic levels, MSCs may be connected through the intermediary of the fixed public network 13.

In addition to the MSCs 20, user data may also be handled in the NSS by what in GSM parlance is known as a gateway MSC (GMSC) 21. The purpose of the GMSC 21 is to handle calls set up in either direction between mobile stations and outside of the PLMN; thus for a call from outside of the PLMN towards a mobile station, the GMSC determines where the call should be routed to catch up with the mobile station. In practice, GMSC functionality is often provided at each MSC.

The remaining components of the NSS 10 are concerned with control functions and these components communicate with each other, with the MSCs and GMSC, and with the fixed public network through signalling links using a signalling system generally based on the SS7 (CCITT Signalling System No. 7) standard. Within the NSS 10 a GSM system uses the MAP (Mobile Application Part) protocols for non-circuit-related signalling traffic and the TUP (Telephone User Part) and ISUP (ISDN User Part) for circuit-related signalling traffic. Again, the signalling paths between components of the NSS 10 are not necessarily direct but will generally make use of the SS7 network associated with the fixed public network.

The components of the NSS not already described are: the Home Location Register (HLR) 23—this contains information about subscribers registered with the PLMN (such as the services available to a particular subscriber and the PLMN network address of the MSC where the subscriber is currently located);

the Visitor Location Register (VLR) 24—generally, each MSC has its own associated VLR which holds both subscriber data about users currently visiting the area covered by the MSC, and data about the current location of each user within the MSCs coverage area;

the Authentication Register (AuC) 25—this component is closely associated with the HLR and holds data providing for subscriber identification and encryption of calls;

the Equipment Identify Register (EIR) 26—this stores information about the mobile stations 12 themselves;

the SMS Gateway 27—in GSM, a special "Short Message Service" is available, this being provided through the SMS Gateway.

Three main control functions may be identified in regulating calls in the PLMN (the signalling traffic being the communication required to implement these functions). These three functions are:

radio resource management—this is the task of establishing, maintaining and releasing stable connections between mobile stations and an MSC despite movements of a mobile station. This management function primarily involves the BSCs but also the BTSs and MSCs.

mobility management—this is the task of maintaining up-to-date user location information so as to permit incoming calls to be routed to the appropriate mobile station; in GSM, the address of the MSC in the area of which a user is to be found, is stored in the user's HLR whilst the user's location within that area is held in the VLR associated with the MSC. This management function involves the MSCs/VLRs and the HLR.

call management—this task involves, as well as the usual control of calls as found in the fixed public network, the routing of calls towards a mobile station when the location of the latter is initially not known. In GSM, for calls towards a mobile station from outside of the PLMN in which the user of the mobile station is registered, it is the task of the GMSC to find out from the home HLR of the user being called, where that user is and then appropriately route the incoming call. The call management function involves the MSC/VLR, HLR and GMSC.

Location Areas and Location Updating

Figure 2:
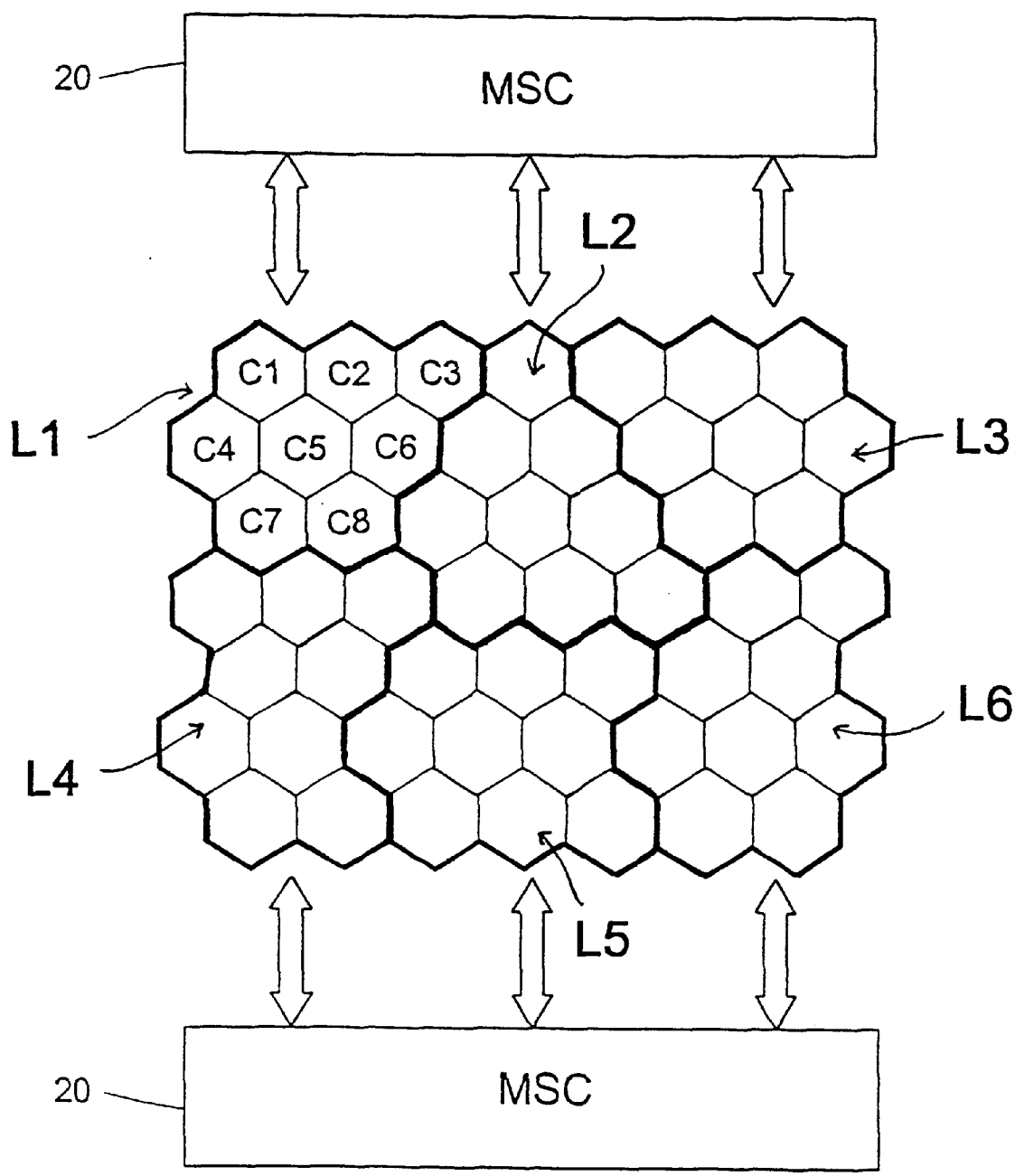
FIG. 2 is a diagram illustrating the relationship between radio cells and location areas in the FIG. 1 system.

Turning now to FIG. 2, this Figure shows a pattern of hexagonal cells each representing a corresponding radio cell, that is, the coverage area of a BTS (assuming that each BTS only covers one area). In FIG. 2 only eight cells have been specifically labelled, these being cells C1 to C8.

Groups of radio cells (generally, but not necessarily, physically adjacent) are logically associated, the resultant coverage areas being referred to as "location areas". Thus, cells C1 to C8 are grouped together and cover a location area L1. In FIG. 2, six location areas L1 to L6 are shown.

In GSM systems, the cells associated with each MSC (that is, the cells associated with the BTSs of the BSSs connected to the MSC concerned) are divided into one or more location areas with the only limitation being that no location area can contain cells associated with more than one MSC. Thus, in FIG. 2 the cells associated with the upper MSC 20 form three location areas L1 to L3, whilst the cells associated with the lower MSC 20 form a further three location areas L4 to L6.

It is worth nothing that the GSM standards do not themselves require that all the cells associated with a particular BSS 11 are in the same location area but this will often be the case.

The purpose of grouping cells into location areas is to facilitate the task of mobility management. In order for a mobile station to be located to receive an incoming call, two basic approaches are possible. Firstly, a paging message could be transmitted in every cell of the PLMN in order to have a searched-for mobile station respond to identify its position; such an approach is, however, very inefficient. The second approach is to have the PLMN store location information on each user which is periodically updated as the user (or rather, his mobile station) moves around the network. This latter approach is the one most usually taken. However, if a location update is effected every time a mobile station moves from one cell to another, a very large amount of signalling traffic would be created. In order to avoid this problem, GSM uses the concept of a location area with a mobile station only initiating a location update when it determines it has changed location area. Since the PLMN now knows the location area of each mobile station, when it is necessary to route an incoming call to a particular mobile, it is only necessary to transmit a paging message in the cells of the relevant location area.

As previously indicated, location information is actually stored in two parts with the address of the MSC in whose area a mobile station is currently located being stored in the HLR, and the local location information (that is, current location area) being stored in the VLR associated with that MSC.

A mobile station can tell when it has changed location area because the BTS of each cell periodically transmits the identity of the cell and location area in which it is located; by storing this location area information, the mobile station can readily tell when it changes location area.

Upon detecting a location area change, the mobile station transmits a "location update request" which is received by the BTS of the cell in which the mobile station is currently to be found. This request is then passed via the BSC associated with the BTS, back to the relevant MSC. The MSC then updates the location information held for the mobile station in the VLR associated with the MSC. In the event that a mobile station moves from a location area covered by one MSC to a location area covered by another MSC, a changeover process is effected between MSCs which also involves the HLR being updated with the address of the MSC into whose area the mobile station has now moved.

A mobile station is also arranged to send out a location update request message, if it receives an indication from the network that it is not known to the VLR in whose coverage area it is currently located.

Finally, in order to ensure that up-to-date location information is maintained on mobile stations, and also to enable the databases in the HLR and VLR to be rebuilt in case of data loss, each mobile station is arranged to send a location update request message (a "periodic" location update request) if it has not sent such a request within a predetermined, network configurable, amount of time.

It should be noted that a mobile station will only generate a location update request from its idle mode and not when it is already in its dedicated mode. Whenever a location update request is generated and sent then, regardless of the reason for the request, the VLR will respond either with a Location Update Accept or Location Update Reject message, as appropriate.

User Identity—IMST and TMSI

Within the international GSM community, each subscriber is uniquely identified by a number, the IMSI (International Mobile Subscriber Identity). This number is fifteen digits or less and as shown in FIG. 3A comprises a 3-digit mobile country code (MCC), a 2-digit mobile network code (MNC) giving a subscriber's home PLMN, and a mobile subscriber identification number (MSIN) identifying the subscriber in his home PLMN. The IMSI is not the telephone number of the subscriber—many telephone numbers can be assigned to a single subscriber.

The IMSI of a subscriber is held in a subscriber identity module (SIM) that plugs into a mobile station. Each time the mobile station accesses the PLMN, the IMSI held in the associated SIM is provided to the PLMN (either directly, or indirectly in the form of a TMSI as will be explained below). The IMSI allows the PLMN to access the HLR where the subscriber is registered to retrieve subscriber-specific data and to record the MSC in whose area the mobile station is currently located, according to context.

Sending the IMSI over the inherently insecure radio path at each PLMN access is undesirable for confidentiality and security reasons. Accordingly a temporary identity number known as Temporary Mobile Subscriber Identity (TMSI) is generally used as an alias for the IMSI. The TMSI is a four octet code allocated by the PLMN on a location area basis and, at any given time, unambiguously identifies the subscriber in the location area concerned. When the mobile station changes location area, the TMSI is generally also changed. A TMSI is only unique within a location area and needs to be combined with the LAI (location area identity) of the relevant location area to provide a PLMN-unique identifier (see FIG. 3B). However, a TMSI is generally used in a context where the location area concerned is either already known or implied.

TMSIs are managed by the current MSC/VLR. For a given location area, a TMSI is allocated to a mobile station when it registers in the location area; this TMSI is released when the mobile station leaves the location area. A TMSI can be allocated either by a dedicated TMSI Reallocation Command passed from the MSC/VLR to the mobile station (and acknowledged by a TMSI Reallocation Complete message) or as part of a Location Update Accept message following on from the mobile station making a Location Update Request upon entering a new location area. TMSI cancellation is usually implicit; in particular, for the mobile station, allocation of a new TMSI cancels any previously allocated TMSI as does receipt of a Location Update Accept message in a new location area.

When a mobile station changes location area, the new TMSI may be completely different from the TMSI used in the previous location area, or it may be the same (the associated LAIs then providing differentiation). It is also possible to explicitly cancel an existing TMSI by sending the TMSI Reallocation Command using the IMSI; in this case, the mobile station reverts to using the IMSI to identify itself to the PLMN until next it is allocated a TMSI.

Clearly, where a mobile station first identifies itself using an IMSI and the corresponding MSC/VLR proceeds to allocate a TMSI, that MSC/VLR knows the IMSI and can therefore access the subscriber's HLR. However, if the mobile station moves to a new location area covered by a different MSC/VLR, this latter will be presented with a TMSI that does not contain sufficient information for the MSC/VLR to access the subscriber's HLR. The new MSC/VLR could make a specific Identify request to the mobile station to have it return its IMSI; however, this compromises the sought-after security. Instead, therefore, the new MSC/VLR generally asks the old MSC/VLR for the IMSI, this being possible because when the mobile station sends the TMSI to the new MSC/VLR it also sends the LAI of the old location area which enables the old MSC/VLR to be identified.

When a TMSI has been allocated and not cancelled, it is retained by the mobile station even when turned off.

Tracking Subscriber Identity

A mobile subscriber's identity is notified to the PLMN by the mobile station being used by the subscriber, whenever the mobile station seeks to establish a connection, that is, in the following circumstances:

CM service request (subscriber initiated service request)

Paging response (mobile station response to a paging message)

Location updating (notification of a new location area by mobile or periodic update)

IMSI Attach and Detach (on switch on and off of mobile station)

CM re-establishment request (following loss of connection)

The subscriber identity given by the mobile station will, of course, be the current TMSI (the current LAI being also sent) or, if none exists, the IMSI; this subscriber identity is referred to below as the operative subscriber identity. The mobile station may also supply the IMSI in response to an Identity request from the PLMN (the identity request may also be used to get the current TMSI).

When subscriber identity is being considered on a PLMN-wide basis, it will be appreciated that for an operative subscriber identity comprising a TMSI, the relevant LAI explicitly or implicitly forms part of the operative subscriber identity; however, where subscriber identity is only being considered within a particular location area, the LAI is not needed.

The operative subscriber identity is changed by the PLMN either by the TMSI Reallocation command or as part of a Location Update Accept message, as already discussed.

Keeping track of the operative subscriber identity for a particular subscriber as identified by an IMSI is an inherent operation of the PLMN infrastructure, this mapping being maintained by the MSC/VLR in which the subscriber is currently registered. In theory, this enables the behavioural characteristics of a particular subscriber to be monitored. However, as a practical matter, accessing the information in the MSC/VLR for non-standard purposes requires substantial modification to existing software with the consequent need to re-qualify the software and associated systems. It is therefore attractive to be able to track the current operative subscriber identity of a particular subscriber using a separate monitoring system that does not rely on the main PLMN infrastructure components but can perform the required tracking by monitoring signalling traffic in the PLMN.

Unfortunately, the messages from the PLMN to the mobile station instructing it to change the operative subscriber identity to a given value, do not include the old subscriber identity so that simply identifying such messages is of little value.

According to the present invention, a message parameter common to both the connection establishment messages and to messages changing the operative subscriber identity is used to establish a link between these messages thereby enabling changes in the operative subscriber identity to be mapped.

In a first embodiment of the present invention, signalling messages on the A interface are monitored and the sought-after linkage between connection-establishment messages that include the current operative subscriber identity, and subsequent messages that change the operative subscriber identity, is provided by the fact that these messages will be passed between a BSC and the corresponding MSC by a connection-oriented protocol, namely the SS7 SCCP protocol in class 2 mode. More particularly, the initial connection-establishment message passed from the BSC to MSC initiates the set up of an SCCP connection and in doing so passes the MSC a local reference that the MSC must use in subsequent communications with the BSC for the transaction to which the connection establishment relates. In replying to the initial message from the BSC, the MSC uses the BSC local reference as the destination local reference for the reply and includes its own local reference as the source local reference of the reply. In subsequent communications for the transaction, the BSC uses the MSC's local reference as the destination local reference for its messages to the MSC. By noting these local references, it is possible to identify all messages relating to the same SCCP connection thereby enabling messages changing the operative subscriber identity to be linked to the initial connection establishment messages. The association of local references with a particular SCCP connection only lasts for the duration of that connection.

In a similar manner, according to a second embodiment of the invention, signalling messages on the Abis interface are monitored and the channel number parameter in these messages is used to provide the linkage between connection-establishment messages that include the current operative subscriber identity and subsequent messages that change the operative subscriber identity. As the channel number may be changed during a transaction (to change from an initial signalling channel to a traffic channel), it is necessary also track such channel number changes.

First Embodiment-Detailed Signalling Example

By way of example of the general manner of operation of the first embodiment, consider the case where a mobile station in idle mode determines that it is in a new location area. This results in the mobile station making a Location Update Request with the current operative subscriber identity; if all is well, the PLMN will respond with a Location Update Accept including a new TMSI to be used as the operative subscriber identity.

More particularly, and with reference to FIG. 4, the mobile station first transmits a Channel Request on the RACH channel which is picked up by a BTS and passed as a Channel Required message to the associated BSC (line ('a'), FIG. 4). The BSC responds by choosing a free channel and activates it in the BTS (this activation and the acknowledgement from the BTS to the BSC are not depicted in FIG. 4). Thereafter, the BSC initiates the sending of an Immediate Assignment message on the PAGCH channel telling the mobile station the details of the channel it has been allocated for further signalling communication (line b).

The mobile station then sets its reception and transmission configuration to the assigned channel and establishes a link-level connection with the BTS on the new channel by sending a SABM frame; this SABM frame also carries the initial message which in the present example includes the Location Update Request and the operative subscriber identity. The Location Update Request is then passed from the BTS to BSC in an Establish Indication message. The BSC on receipt of this message sets up an SCCP connection with the corresponding MSC by means of a Connection Request message onto which the Location Update Request is generally piggybacked (line (c) in FIG. 4).

Figure 5:
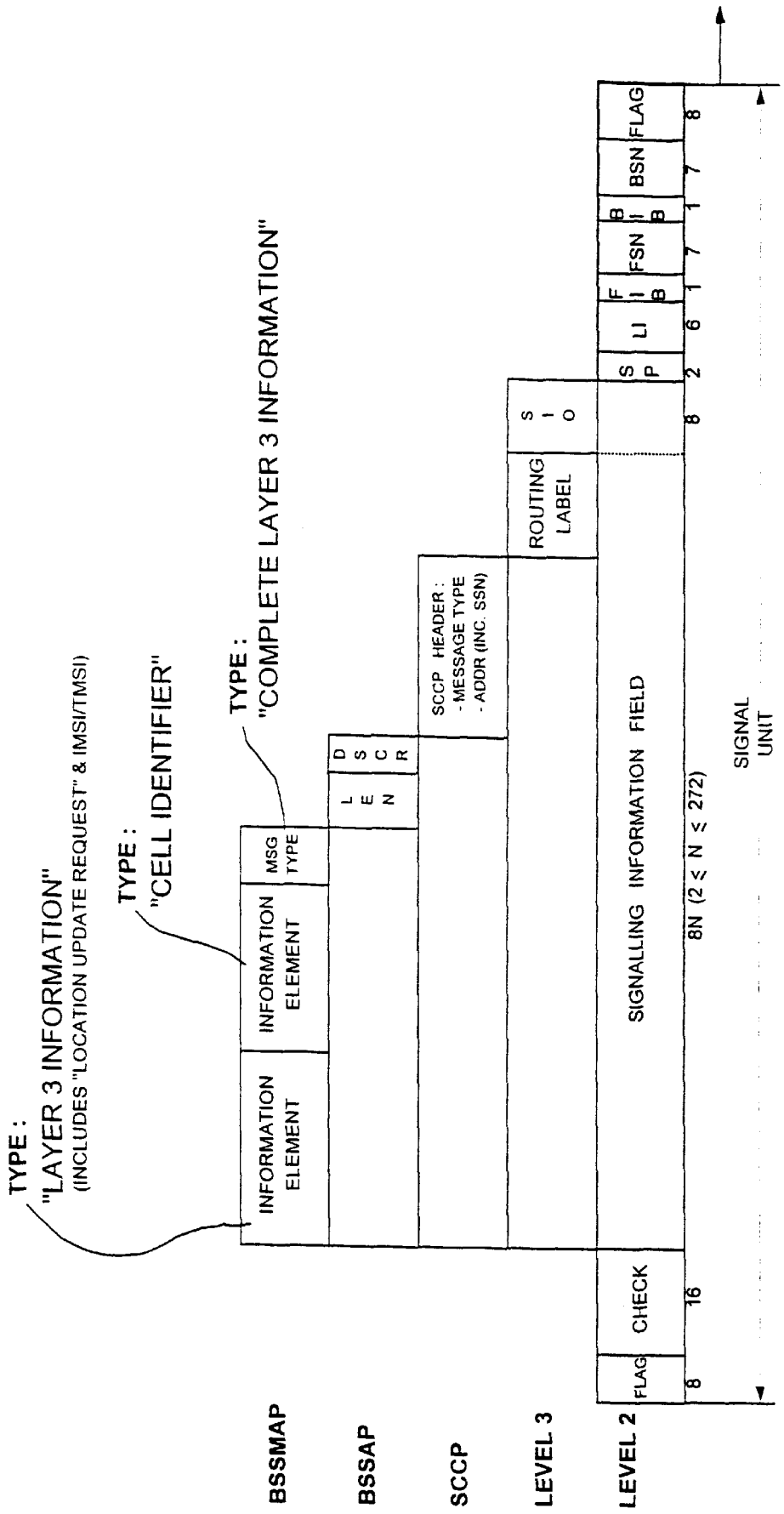
FIG. 5 is a diagram illustrating the layered format of the message used to carry the location update request in FIG. 4.

The format of this first message from the BSC to MSC is illustrated in FIG. 5. As for all messages on the 'A' interface, the SS7 SCCP (Signalling Connection Control Part) and underlying MTP (Message Transfer Part) provide the transport service. More particularly, information is transported in MTP level 2 signalling units, the composition of which is a Flag field, a Backward Sequence Number BSN field, a Backward-Indicator bit BIB, a Forward Sequence Number FSN field, a Forward-Indicator bit FIB, a Length Indicator LI, a Spare SP field, a Service Information Octet SIO, a Signalling Information Field SIF, a Check field, and a terminating Flag field. MTP level 3 information is contained in the SIO and in a routing label forming part of the level 2 signalling information field. The routing label includes source and destination addresses for the signalling unit in terms of point codes. Above MTP level 3 is the SCCP layer for carrying information according to a required service type (in this case, connection-oriented). An SCCP header includes further addressing information that, inter alia, specifies what is termed a "subsystem number" for identifying the user of the transport service provided by the SCCP. In the present case, the user is the Base Station Subsystem Application Part (BSSAP) peer-to-peer protocol operating between the BSS and MSC concerned. BSSAP messages are identified by a subsystem number of "FE" in hex. The SCCP header also normally includes both the afore-mentioned source and destination local references for the connection concerned though, of course, for the present Connection Request message only the source local reference (for the BSC) will be present as this message is the initial message for the connection.

BSSAP is sub-divided into two parts, each BSSAP message being associated with one or other part as indicated by a discriminator octet (DSCR in FIG. 5). These two parts are a BSS Management Application sub-part (BSSMAP) which is used for radio resource (RR) and BSC management; and a Direct Transfer Application sub-part (DTAP) which is used for the transfer of call control management (CM) and mobility management (MM) messages. Location update requests are related to mobility management and it might therefore be expected to find such requests embedded in DTAP messages. In fact, location update requests are embedded in BSSMAP messages. The reason for this is that each location update request requires the establishment of a new radio connection between the mobile station concerned and the relevant MSC, and the establishment of such a connection is a radio resource management issue. Indeed, whenever a new radio connection is established, the "initial message" concerned with that connection is piggy-backed onto the RR message on the 'A' interface involved in setting up the connection through to the relevant MSC. Initial messages, including Location Update Requests, are carried in BSSMAP "Complete Layer 3 Information" messages, these latter being indicated by a message type octet '01010111' (the rightmost bit being the first bit of the octet). Each "Complete Layer 3 Information" message comprises two information elements, namely Cell Identifier and Layer 3 Information. It is the "Layer 3 Information" information element that actually contains the Location Update Request as well as the operative subscriber identity (for a TMSI, the old location area identifier LAI, which is an element of the current TMSI, can also be found in this information element). The "Cell Identifier" information element includes the current location area of the mobile station.

According to the first embodiment of the present invention a monitor probe monitoring the BSC/MSC link is arranged to detect all initial messages such as that illustrated in FIG. 5 and extract the operative subscriber identity from the Layer 3 Information element as well as the SCCP local reference of the BSC. This local reference is subsequently used by the monitor probe to identify all messages relating to the same SCCP connection until the latter is taken down.

Returning now to FIG. 4, following receipt of the Location Update Request by the MSC, authentication and ciphering messages may, optionally, be exchanged between the mobile station and the MSC (lines (d) to (g)). The probe monitoring the relevant BSC/MSC link knows from the source local reference or destination local reference (depending on message direction) that these messages relate to the SCCP connection associated with the location update transaction but by monitoring the message types, the probe determines that the messages do not concern modification of subscriber identity.

In due course, the MSC sends a Location Update Accept message which, in the present example, also sets a new TMSI (line (h) in FIG. 4). This message is detected by the monitor probe as associated with the SCCP connection of interest and this allows the new TMSI to be linked with the old operative subscriber identity, providing the sought-after mapping. The Location Update Accept message, being a mobility management message (which is not also an initial message) is carried in a DTAP message on the A interface.

Upon receipt of the Location Update Accept message including the new TMSI, the mobile station returns a TMSI Reallocation Complete message (line (i) in FIG. 4); this message is also carried in a DTAP message on the A interface. Finally, the MSC sends a Clear command in a BSSMAP message piggybacked on an SCCP Release message. The BSC passes on the Release Command as a Channel Release message (line (j) in FIG. 4), thereafter sending back a Clear Complete message to the MSC in a BSSMAP message piggybacked on an SCCP Release Complete message. This release complete message and subsequent release messages between the mobile station, BTS and BSC are not shown in FIG. 4. The monitor probe on the A interface detects the SCCP connection release messages and cancels its record of the SCCP connection.

Figure 6:
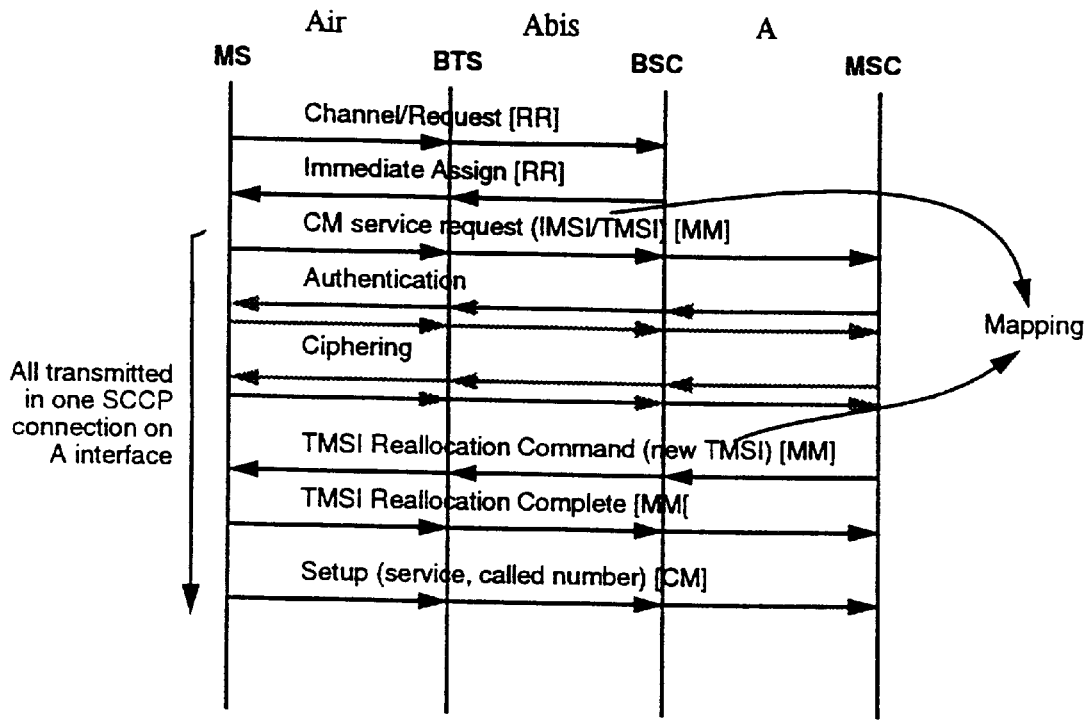
FIG. 6 is a diagram illustrating the signalling messages passed between a mobile station and an MSC of the FIG. 1 system during a subscriber-initiated service request procedure.
Figure 7:
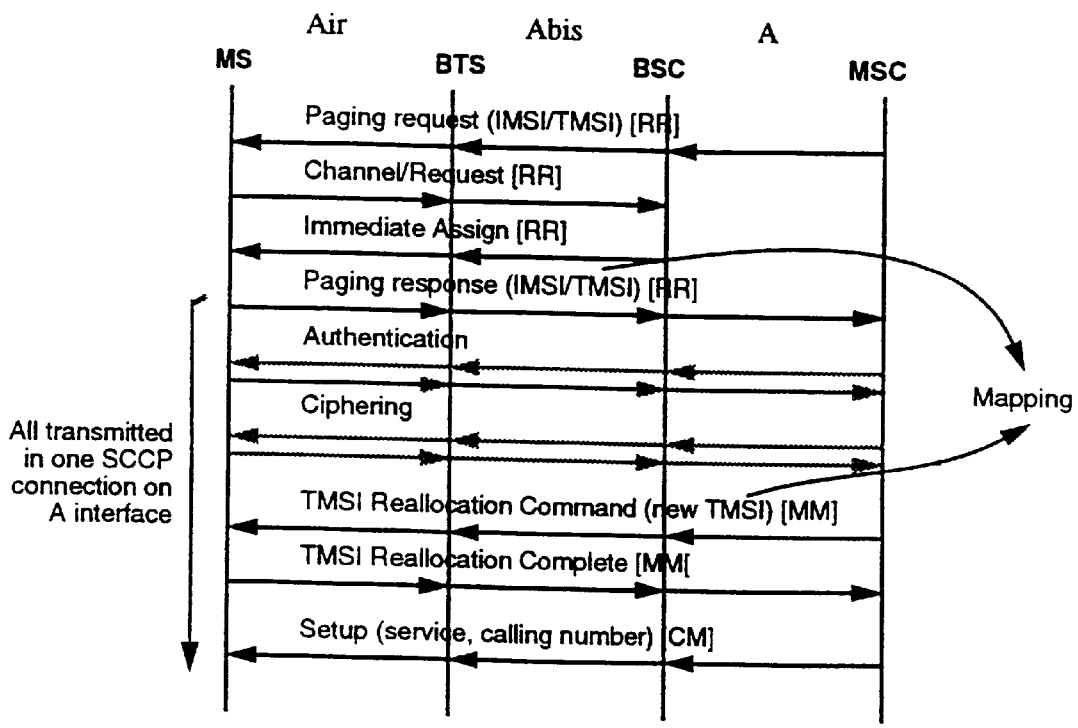
FIG. 7 is a diagram illustrating the signalling messages passed between a mobile station and an MSC of the FIG. 1 system during a paging response procedure.

FIGS. 6 and 7 are further examples similar to FIG. 4 showing the mapping between a subscriber identity operative at the time of connection establishment, and a subsequently-assigned TMSI, the linkage between the relevant messages being established through the local references of the SCCP connections concerned. FIG. 6 relates to a subscriber-initiated service request and FIG. 7 relates to a paging-initiated response from the mobile station. In both cases, the MSC sends a TMSI Reallocation Command which the mobile station acknowledges in a TMSI Reallocation Complete message; both messages are carried in DTAP messages on the A interface.

First Embodiment—Basic Implementation

As illustrated in FIG. 1, each 'A' interface is monitored by a respective monitor probe 40. These monitor probes 40 extract subscriber identity information from the messages on the 'A' interface and pass this information in report messages back to a central station 42 where further processing is carried out. Communication between the monitor probes 40 and the central station 42 is effected over a network 41 that may be a dedicated network or an existing one such as the operations and management network associated with the main network.

Figure 8:
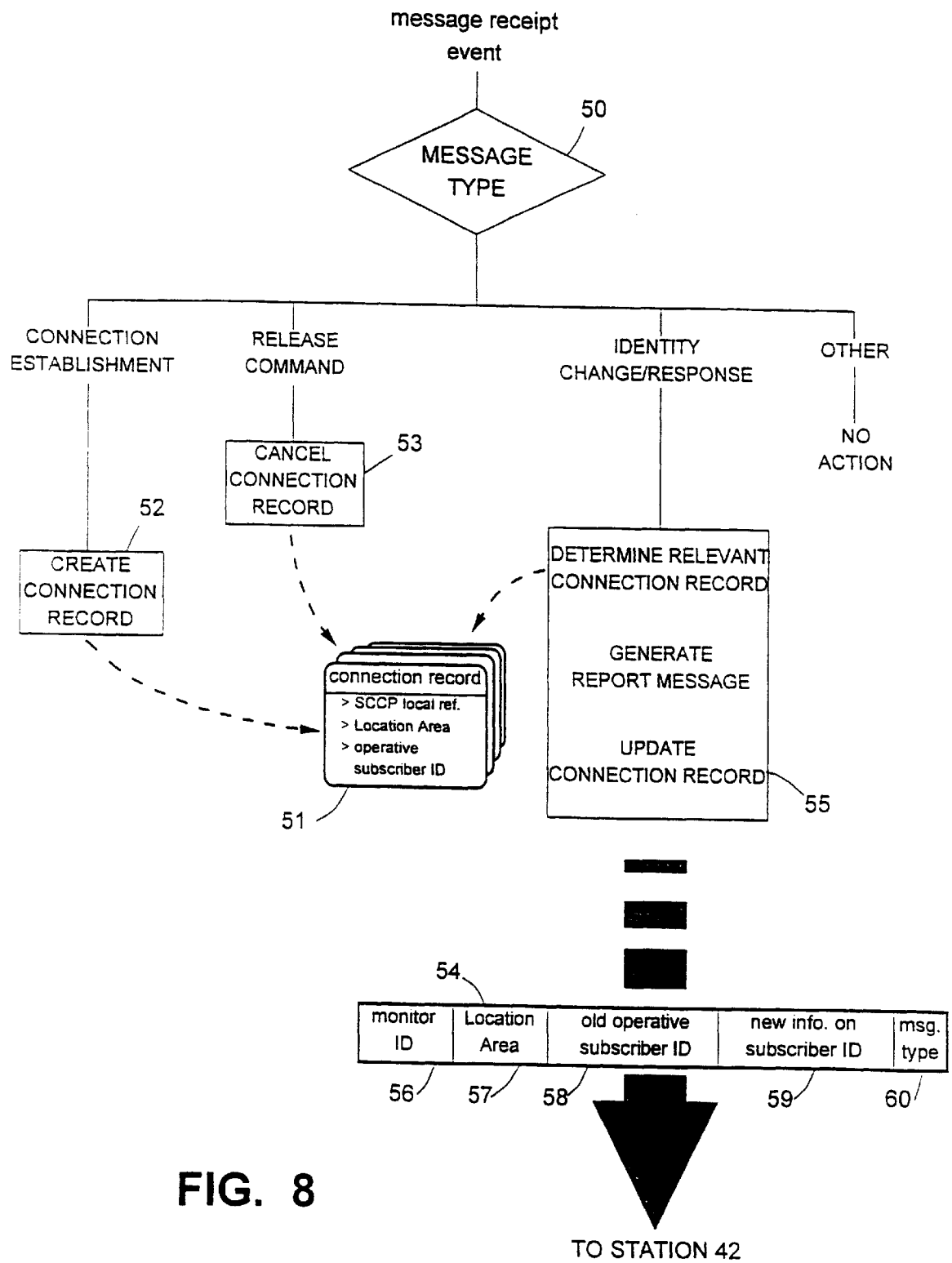
FIG. 8 is a diagram illustrating the processing in a monitor probe of messages detected as carrying subscriber identity information, this processing including the generation of report messages.

FIG. 8 illustrates the general operation of a monitor probe 40. On receipt of a message, the probe 40 decodes the message to determine its type (step 50). If the message is an "initial message" concerning connection establishment, the probe 40 creates a connection record 51 for the SCCP connection being set up and stores in this record the following elements (step 52):

the location area of the cell in which the mobile station is currently located, this information being extracted from the Cell Identifier information element of the monitored initial message (in certain cases, this information may not be present);

the operative subscriber identity (IMSI, or TMSI plus the LAI of the location area in which the TMSI was allocated) given in the Layer 3 Information information element of the monitored initial message; and the BSC local reference for the SCCP connection.

If the monitored message is a Release Command, the probe 51 uses the destination local reference to identify and cancel the corresponding connection record 51 (step 53).

Where the monitored message changes the operative subscriber identity (a TMSI Reallocation command or a Location Update Accept message) or gives the true subscriber identity (in a Identity Response message), the monitor probe 40 first determines the corresponding connection record from the appropriate SCCP local reference and then generates a report message 54 to report the new information on subscriber identity to the central station 42 (step 55). This report message 54 comprises a probe ID field 56 identifying the probe, a field 57 containing the current location area LAI as held in the corresponding connection record 51, a field 58 holding the old operative subscriber identity as held in the connection record 51, a field 59 containing the newly detected subscriber-identity information, and a report type 60 indicating whether the report message concerns an identity change or is reporting an identity response message. In the case of an identity change, the field 59 will contain the new operative subscriber identity (either the IMSI, or more probably, a new TMSI and the current LAI). In the case of an Identity Response message containing an IMSI, the field 59 contains the IMSI (in fact, if the operative subscriber identity is also the subscriber IMSI, no report message is generated). Each of the fields 58, 59 will typically be compound, comprising both an indicator of identity type (IMSI or TMSI+LAI) as well as the identity itself (even without such a type indicator, it would be possible to distinguish between the two identity types by their length but it is more convenient to use an indicator).

With regard to the identity change messages, the output of the report message is preferably deferred until a TMSI Reallocation Complete message acknowledging the change is detected by the probe 40 for the relevant SCCP connection.

As well generating the report message 54, in step 55 monitor also updates the relevant report record with any pertinent newly-detected information. Thus, if the operative subscriber identity has been changed, this new operative identity is stored in the connection record in place of the previously-stored operative subscriber identity. Furthermore, where a Location Update Accept message or TMSI Reallocation command is being processed by the monitor 40, since both these message types include the current location area identity, the monitor 40 also takes the opportunity to update the connection record 51 with this information, replacing the previous entry.

For message types other than those discussed above, the monitor probe 40 need take no action in respect of subscriber identity tracking (except in relation to handovers, as discussed in the following section). However, as it may be useful to keep track of the current location area of a mobile station, provision can also be made for reporting changes in location area that are not associated with a change in subscriber identity (this can occur if the IMSI is being used in both the old and new location areas). More particularly, if a Location Update Request is detected followed by a Location Update Accept not including a Reallocation command and an explicit TMSI Reallocation command does not follow within a predetermined timeout period, then a report message 51 is generated to report the new location area of the mobile station in field 57; in this case, field 60 can be arranged to indicate that the report message is simply reporting a location area change.

Turning now to a consideration of the operation of the central station 42, this station maintains a table 61 (see FIG. 9) which includes an entry for each known IMSI, IMSI(a) to IMSI(m), this entry giving by location area LAI(1) to LAI(N), the current operative TMSI, if any, corresponding to the IMSI concerned.

On receipt of a report message 54 from any one of the monitor probes 40, the central station 42 classifies (step 62) the information it contains into one of five cases according to the contents of the field 60 and of the fields 58 and 59:

Case A—the operative subscriber identity has been changed from an IMSI to a TMSI;

Case B—the operative subscriber identity has been changed from a TMSI to a new TMSI (potentially in a different location area);

Case C—the operative subscriber identity has been chanced from a TMSI back to the IMSI;

Case D—the IMSI of a subscriber is being reported together with the current operative TMSI;

Case E—location area has been updated without a change of the operative subscriber identity.

The station 42 then proceeds to update the table 61 (step 63) in dependence on its classification of the reported information. The update procedure for each case is as follows:

Case A: IMSI to TMSI Change—The table 61 is first searched for the IMSI. If the IMSI is located, any existing TMSI that might be present in the IMSI entry is removed and the new TMSI is added under the appropriate location area. If the IMSI is not found, a new table entry is created for the IMSI and the new TMSI entered according to its location area.

Case B: TMSI to TMSI Change—The table 61 is first searched for the old TMSI (contained in message field 58), this search being facilitated by the organisation of the table by location area, the location area of the old TMSI being known. If the old TMSI is not found in the table, then the corresponding IMSI must still be unknown in which case no entry is possible and the updating operation is terminated. Assuming, however, that the old TMSI is found, the new TMSI is inserted into the same IMSI entry under the appropriate location area and the old TMSI is removed.

Case C: TMSI to IMSI Change—The IMSI is first searched for in table 61, and if found, any TMSI entered in the IMSI entry is removed. If the IMSI is not found in the table, a new IMSI entry is added without any TMSI (a 'no TMSI' indication can optionally be added under the appropriate location area in which event in Case A this indication would need removing when a TMSI was allocated).

Case D: IMSI and Operative TMSI reported—This case can be handled in the same manner as Case A above.

Case E: Location Update reported—This case simply involves the subscriber identity entry (here, generally a "no TMSI" indication) being moved to the appropriate location area column of table 61.

By updating the table 61 in this way, the central station can keep track of the current operative subscriber identity for all subscriber's whose IMSIs are known. Of course, as will be appreciated by persons skilled in the art, it would also be possible to arrange for changes in TMSI to be tracked even if the corresponding IMSI was not known. The table also enables the current location area of the subscriber to be tracked.

First Embodiment—Dealing With Handovers

In the foregoing, it has been assumed that each transaction only involves one SCCP connection—in practice, as a subscriber moves, the mobile station may pass from one cell to another and this may result in a change in BSC which, of course, involves the original SCCP connection being taken down and a new one established. Whilst there are well known handover procedures for coping with changes in cell during the course of a communication session, changes in SCCP connection can impact the tracking method described above.

More particularly, it is quite likely that no messages will appear on the new SCCP connection to give the operative identity code whereas a TMSI reallocation message could be issued changing the operative identity code; in such a situation, the tracking method described above would be inadequate. What is required is some way of linking the old and new SCCP connections so that the operative identity code known for the old SCCP connection can be transferred across into the record established for the new connection.

To achieve this, the monitor probes 40 are arranged to monitor hand-over related signalling on the A interfaces, so as to collect common parameters that appear on both an old SCCP connection about to be taken down in respect of a communication session and on a new SCCP connection established to take over a communication session; the values of these common parameters are then compared to match up old and new SCCP connections related to the same communication session.

Figure 10:
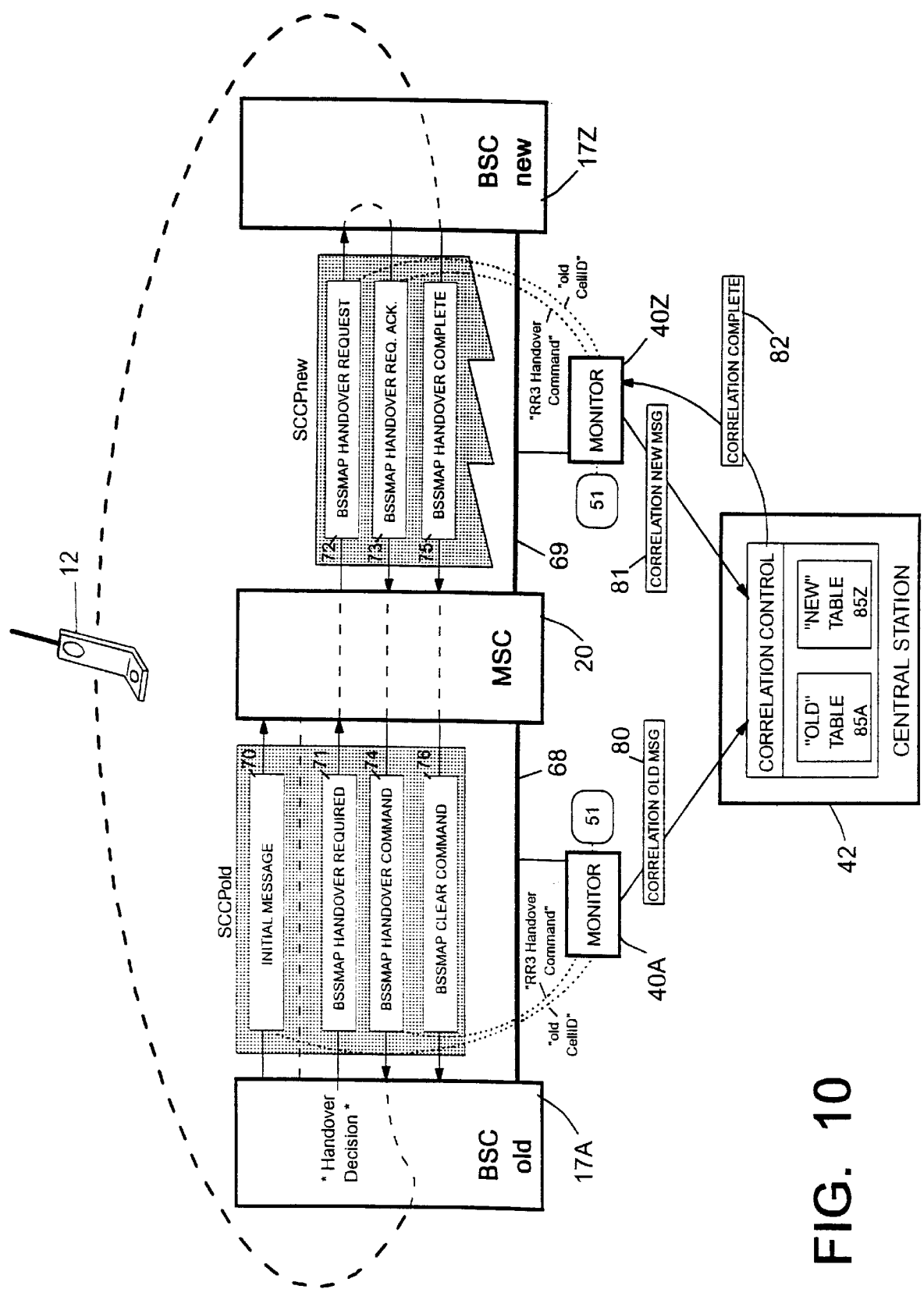
FIG. 10 is a diagram illustrating the signalling messages passed between an MSC and two BSCs of the FIG. 1 system during a handover operation involving a change in BSC.

By way of example, consider the case of a handover between one BSC, hereinafter "BSCold", and another BSC, hereinafter "BSCnew", connected to the same MSC (as will become apparent, the method to be described for correlating old and new SCCP connections relating to the same communication session across a hand-over, applies equally to the case where the MSC also changes). FIG. 10 illustrates the A-interface links involved in the hand-over, the related signalling connections between the BSCs and the mobile station being omitted for clarity. More particularly, mobile station 12 initially communicates with MSC 20 via BSCold 17A using an SCCP connection "SCCPold" established across A-interface link 68 by an initial message 70; after handover, the mobile station communicates with MSC 20 via BSCnew 17Z using an SCCP connection "SCCPnew" established across A-interface link 69 by a handover request message 72. Links 68 and 69 are monitored by respective monitor probes 40A and 40Z, these probes being operative to detect hand-over related messages and to relate them, using the SCCP local references, to the connection records 51 established for the SCCP connections concerned.

FIG. 10 shows the message flows seen on SCCPold and SCCPnew during the course of a successful hand-over. It is BSCold 17A that makes the decision that a handover is required, this decision being based on information it receives from the mobile station. On deciding that a handover is required, BSCold 17A sends a BSSMAP Handover Required message 71 to the MSC 20. MSC 20 is responsible for making the decision to effect a handover and if it makes a positive decision, it opens SCCPnew to BSCnew 17Z and sends a BSSMAP Handover Request message 72 to BSCnew 17Z. BSCnew, after allocating a radio channel for the mobile station, answers with a BSSMAP Handover Request Acknowledge message 73 that contains a RR3 Handover Command signalling unit; this is the piece of information that will ultimately get passed to the mobile station to tell it, in terms of radio frequencies and timeslot number, where it is supposed to tune to.

On receiving the BSSMAP Handover Request Acknowledge message, MSC 20 puts the RR3 Handover Command into a BSSMAP Handover Command 74 which it sends over SCCPold to BSCold 17A; BSCold 17A forwards this message to the mobile station 12.

The mobile station then establishes contact with BSCnew 17Z using the radio channel allocated by the latter. Upon contact being successfully established, BSCnew sends a BSSMAP Handover Complete message 75 on SCCPnew to MSC 20 which then sends a BSSMAP Clear command 76 on SCCPold to BSCold 17A, this command including a 'handover successful' indication. SCCPold is thereupon terminated.

From the foregoing, it will be seen that the RR3 Handover Command signalling unit appears both on SCCPnew and SCCPold. Matching the parameter values of this signalling unit forms the basis of correlating SCCPnew and SCCPold. In fact, it is conceivable that two hand-overs could occur in a PLMN at substantially the same moment with the same RR3 Handover Command parameter values, in which case solely relying on these parameter values to effect SCCP connection correlation, whilst generally producing satisfactory results, will occasionally lead to ambiguity and possible errors (or at least inability to make a correlation). It is therefore preferred to effect correlation on the basis of both RR3 Handover Command parameters values and the cell ID of the cell from which the hand-over is being effected ("old cellID"); including this additional parameter in the match criteria makes it highly unlikely (though, in theory, not impossible) that an ambiguity will occur. The old CellID appears on SCCPold in the initial message 70 setting up SCCPold (if a BSC-internal handover subsequently occurs changing the operative cell without changing the SCCP connection, then the cell ID of the new cell is the one that must be used as the "old CellID" for correlating SCCP connections should a subsequent handover involve a change in BSC—this new "old CellID" can be ascertained from the BSSMAP handover Performed message, not illustrated, which a BSC will send to the associated MSC in the case of a BSC-internal handover). The old CellID appears on SCCPnew in the BSSMAP Handover Request message 72.

The process of correlating SCCPold and SCCPnew thus proceeds as follows:

Monitor 40A monitoring link 68:

(i) when a new SCCP connection is set up by an initial message, the monitor 40A creates a new connection record 51, extracts the old CellID from the initial message, and associates it with the newly-created connection record;

(ii) upon a BSSMAP Handover Performed message (not shown) being detected by monitor 40A, it extracts the new cell ID and substitutes it for the old CellID associated with the connection record identified by the SCCP local references of the BSSMAP Handover Performed message 71;

(iii) When the monitor 40A detects a BSSMAP Handover Command 74, it extracts the RR3 Handover Command parameter values and associates them with the relevant connection record (again, identified by the SCCP local references of the command 74);

(iv) Upon the monitor 40 A detecting a BSSMAP Clear Command 76, if the connection record 51 identified from the SCCP local references of the command 76 already has old CellID and RR3 Handover Command parameter values associated with it, the monitor 40A sends a Correlation Old message 80 to the central station 42 including the monitor ID, the old CellID, the parameter values of the RR3 Handover Command, and the current operation subscriber identity as held in the connection record 51. The connection record is then removed.

Monitor 40Z monitoring link 69:

(i) upon the MSC setting up SCCPnew, monitor 40Z creates a corresponding connection record 51 including at least one of the SCCP local references (if only the BSC local reference is stored as in the embodiment previously described, then this reference is taken from the BSCnew reply to the initial Connection set up message from the MSC).

(ii) when a BSSMAP Handover Request message 72 is detected by monitor 40Z, it extracts the old CellID and associates it with the connection record identified by the appropriate SCCP local reference of the message 72;

(iii) upon the monitor 40Z detecting a BSSMAP Handover Request Acknowledgement 73, it extracts the RR3 Handover Command parameter values and associates them with the record identified by the appropriate SCCP local reference of the message 73;

(iv) when a Handover Complete message 75 is detected by monitor 40Z, it checks whether the connection record identified by the appropriate SCCP local reference of the message 75 has associated old CellID and RR3 Handover Command parameter values—if these parameter values are present, the monitor 40Z sends a Correlation New message 81 to the central station 42 including the monitor ID, the old CellID, the parameter values of the RR3 Handover Command, and the SCCP local reference used to identify the connection record.

(v) where the central station 42 is able to correlate an SCCPold with an SCCPnew monitored by monitor 40Z (see below regarding how this is done), the monitor 40Z receives in due course a Correlation Complete message 82 that contains the SCCPnew connection and the operative subscriber identity from the corresponding SCCPold connection. The monitor 40Z uses the SCCP local reference in message 82 to locate the corresponding connection record 51 and then inserts the operative subscriber identity into the record.

Central Station 42

(i) Station 42 maintains two correlation tables, these being an Old correlation table 85A each entry of which holds the contents of a corresponding Correlation Old message 80, and a New correlation table 85Z each entry of which holds the contents of a corresponding Correlation New message 81. Each entry in tables 85A and 85Z has an associated timestamp corresponding to the time of entry creation.

(ii) When a Correlation Old message 80 is received, the station 42 checks the New correlation table 85Z for any entry having the same values of old CellID and RR3 Handover Command parameter values. If no match is found, the contents of the Correlation Old message 80 are entered in table 85A. However, if a match is found, a Correlation Complete message 82 is generated and sent to the monitor 40Z identified in the entry held in table 85Z; this entry is thereafter cancelled.

(iii) When a Correlation New message 81 is received, the station 42 checks the Old correlation table 85A for any entry having the same values of old CellID and RR3 Handover Command parameter values. If no match is found, the contents of the Correlation New message 81 are entered in table 85Z. However if a match is found, a Correlation Complete message 82 is generated and sent to the monitor 40Z identified in the Correlation New message 81; the relevant entry in the Old table 85A is then cancelled.

(iv) Periodically, the tables 85A and 85Z are scanned and any entries older than a predetermined threshold, as judged from their timestamps, are deleted. This predetermined threshold is set by the maximum delay likely to occur between related correlation messages 80 and 81. In this way, any unmatched table entries are periodically removed.

The handover operation may, of course, fail for a number of different reasons and the monitors 40 need to be able to detect and handle such situations (generally, station 42 will be unaware of attempted handovers that fail). Thus, if BSCnew 17Z returns a BSSMAP Handover Failure message instead of a BSSMAP Handover Request Acknowledge 73, monitor 40Z on detecting this message is arranged to remove its corresponding connection record 51, whilst monitor 40A is arranged to cancel the old CellID information associated with its connection record 51 for the relevant SCCPold connection.

After the BSSMAP Handover Command 74 has been passed to BSCold 17A, handover failure may occur for any of the following reasons:

(a) The mobile station 12 is unable to establish contact with BSCnew and reverts to the old radio channel. In this case, a BSSMAP Handover Failure will be passed from BSCold 17A to MSC 20 on SCCPold enabling monitor 40A to cancel the handover parameters associated with the corresponding connection record. The MSC then issues a BSSMAP Clear Command to BSCnew 17Z on SCCPnew; the monitor 40Z detects this command and thereupon removes the corresponding connection record.

(b) The mobile station 12 fails to establish contact with BSCnew but does not revert to the old radio channel. In this case, a BSSMAP Clear Request is passed from BSCold 17A to MSC 20 on SCCPold in response to which MSC sends a BSSMAP Clear Command to both BSCold and BSCnew. Monitors 40A and 40Z detect the clear command and remove their corresponding connection records.

(c) The MSC decides to abort the handover procedure and sends a BSSMAP Clear Command to both BSCold and BSCnew on SCCPold and SCCPnew respectively. The monitors 40A and 40Z detect this command and remove their corresponding connection records.

The Clear Commands issued in the above cases will include cause codes enabling the various cases to be distinguished from one another.

It will be appreciated that the foregoing method of correlating SCCPold and SCCPnew does not rely on MSC 20 being the switching point for the handover so that switching could instead occur at an anchor MSC (the primary MSC involved in setting up a particular call—this MSC does not change throughout the call).

It may be noted that in the embodiment described above, tracking the SCCP connection across a handover does not alter the manner in which subscriber identity change reports are made by the monitors 40A and 40Z nor how such messages are handled at the central station 42.

Finally, it may also be noted that since the current location area of the mobile station is contained in the BSSMAP Handover Request message 72, this information can readily be extracted by monitor 40Z and inserted in the connection record 51 associated with SCCPnew. Because it is conceivable that the location area may be changed by the handover at the same time as the operative subscriber identity is left unchanged (where it is the IMSI and therefore valid in all location areas), monitor 40Z is arranged to generate a report message 54 of the location update type if it detects no TMSI Reallocation command within a predetermined period following the handover being successfully completed; this message may well be redundant but this will not cause any problems at the central station 42.

Second Embodiment

As already noted, the second embodiment of the present invention operates in a similar manner to the first embodiment but monitors messages on the Abis interface rather than the A interface and uses the channel number parameter to link messages relating to the same transaction. The channel number parameter identifies the channel type, TDMA offset and time slot number of the radio channel to be used on the air interface; the channel number parameter appears in certain messages on the Abis interface, either in a Channel Number information element or as part of a Channel Description information element.

By way of example of the operation of the second embodiment, consider again the location update transaction depicted in FIG. 4. The Location Update Request (line c) is carried on the Abis interface in an Establish Indication message that includes the Channel Number information element identifying the signalling channel previously assigned by the BSC concerned for handling the location update procedure. A monitor probe on the Abis interface detects this Establish Indication message, creates a record for the channel number concerned, and enters the operative subscriber identity contained in the Establish Indication message into the record. In due course, the same monitor probe detects a Location Update Accept (line h) for the same channel number, both the Location Update Accept and channel number being carried in information elements of a Data Request message. As a result, the monitor probe sends a report message back to a central station. The monitor probe also updates its record for the channel by recording the new operative subscriber identity contained in the Location Update Accept. In fact, as already indicated for the first embodiment, the sending of the report message and record updating may be delayed until after the corresponding TMSI Reallocation Complete message is detected, carried in a Data Indication message on the Abis interface. Finally, at the end of the location updating transaction, a Channel Release message is sent from the BTS to the mobile station; this release message is detected by the monitor probe which thereupon cancels the record it was maintaining for the channel concerned.

From the foregoing it can be seen that in respect of subscriber identity tracking, the general operation of the monitor probe, the form of the report message, and the operation of the central station can be substantially the same for the second embodiment as the corresponding components of the first embodiment. Accordingly, these components will not be described in detail for the second embodiment, it being apparent to a person skilled in the art what variations are necessary to adapt them to the specifics of the Abis interface.

The foregoing review of the second embodiment did not consider what happens in the case of a handover. However, before describing how handover is dealt with, another complication, this time specific to the second embodiment, will be mentioned. This complication is that even without a cell change, the allocated channel will be changed in the case where it is necessary to assign a traffic channel following initial allocation of a signalling channel. This change will of course result in a new channel number being assigned. Tracking of channel number changes can be effected by looking for an Assignment Command message passed from the BSC to the mobile station, this command being sent on the old channel and including details of the new channel to be used in a Channel Description information element. When a monitor probe detects the Assignment Command it modifies the record it is maintaining for the old channel number by changing the channel number to the new one.

Figure 11:
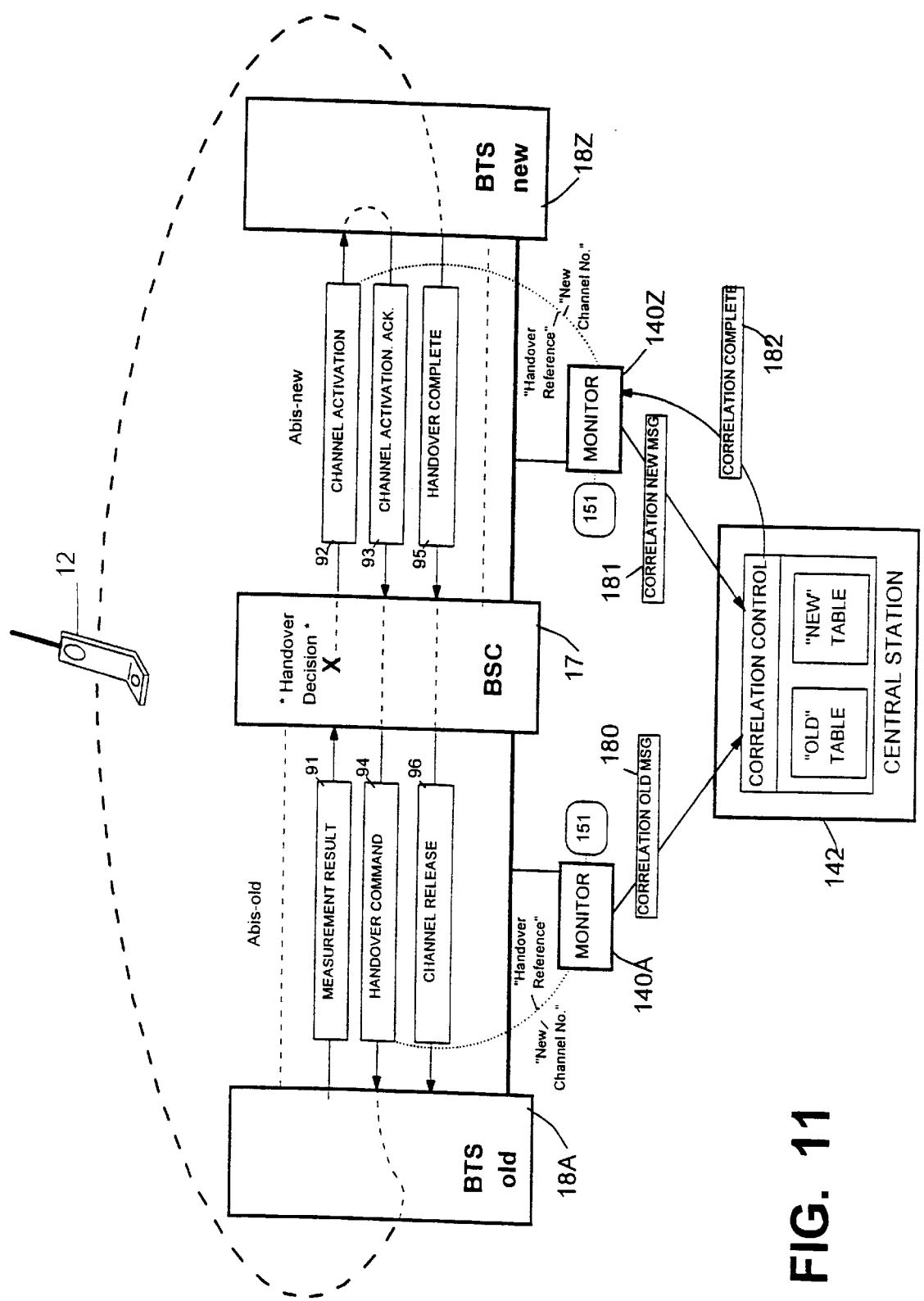
FIG. 11 is a diagram illustrating the signalling messages passed between a BSC and two BTSs of the FIG. 1 system during a handover operation involving a change in BTS.

Consideration will now be given as to how the second embodiment follows a procedure (transaction) across a handover. FIG. 11 illustrates the main messages exchanged with a BSC 17 when a mobile station 12 is handed over from one BTS (BTSold 18A) to another (BTSnew 18Z) connected to the same BSC 17. The Abis interface between BTSold 18A and BSC 17 is monitored by monitor probe 140A whilst the interface between BTSnew 18Z and BSC 17 is monitored by monitor probe 140Z.

BSC 17 makes its decision regarding handover based on radio signal measurements received from BTSold 18A in a Measurement Result message 91, this message indicating the channel to which it relates by the inclusion of the channel number of the mobile/BTSold channel. Upon deciding to initiate handover, BTS 17 sends a Channel Activation message 92 to the BTSnew 18Z and receives a Channel Activation Acknowledgement message 93 in return. The Channel Activation message contains the channel number of the channel to be used by BTSnew 18Z as well as a Handover Reference number; monitor 140Z on detecting the Channel Activation message, creates a new record 151 for the channel number identified in the message and associates the Handover Reference number of the message with that record 151.

After receiving the Channel Activation Acknowledgement message 93, BSC 17 sends a Handover Command 94 to BTSold 18A. The Handover Command message includes, of course, the channel number for the existing channel between BTSold and the mobile station. In addition, the Handover Command contains a Channel Description information element with the channel number of the channel to be used by BTSnew 18Z, and the Handover Reference number; both the channel number for BTSnew and the Handover Reference are extracted by monitor probe 140A and associated with the record 151 previously-established for the current channel between BTSold and the mobile station 12.

In due course, the mobile station changes to BTSnew and the latter sends a Handover Complete message 95 to BSC 17. On detecting this message, the monitor probe 140Z sends a Correlation New message 181 to central station 142 containing the channel number for BTSnew and the Handover Reference number. When the BSC receives the Handover Complete message it sends a Channel Release message 96 to BTSold. Monitor 140A detects this message and thereupon sends a Correlation Old message 180 to central station 142; this message contains not only the channel number for BTSnew and the Handover Reference number, but also the current operative subscriber identity. Central station 142 then uses the Correlation Old and Correlation New messages to associate the new channel with the old one and thereupon pass the operative subscriber identity to monitor 140Z for adding to the relevant record 151. The operation of station 142 is substantially the same as station 42 of FIG. 10; in particular, a timestamping mechanism is used to ensure that only the most recent Correlation Old and Correlation New messages are retained for matching thereby minimising the risk of erroneous matches.

Monitor probe 140Z thereafter monitors the Abis interface between BSC 17 and BTSnew 18Z to detect messages relating to the new channel and identity any changes in operative subscriber identity in the manner already described.

It will be appreciated that apart from the different handover parameters detected by the monitors probes of the first and second embodiment, the monitor probes 140A,Z operate in substantially the same manner as the monitor probes 40A,Z in respect of handover following.

It will also be appreciated that the foregoing method of correlating the old and new channels associated with the same transaction does not rely on BSC 17 being the switching point for the handover so that switching could instead occur at an MSC or anchor MSC (in other words, the BTSold and BTSnew need not be connected to the same BSC).

Monitoring Subscriber Behaviour

For a subscriber whose IMSI is contained in table 61, it is possible to monitor the behaviour of that subscriber by passing the current operative subscriber identity (the TMSI entered for the subscriber's IMSI entry in table 61 or where no TMSI is present, the IMSI itself) to all monitor probes 40 and instructing the probes to monitor and report activity of interest. Should the operative subscriber identity change, then at the time the table 61 is updated, the central station 42 notifies the probes 40 of this new identity, the old identity to be watched being cancelled in the probes.

In fact, because the table 61 identifies the current location area of a subscriber, it is not necessary for all monitor probes 40 to be instructed to watch for subscriber activity; instead, only those probes 40 in the current location area indicated by table 61 need to be instructed. In this case, when the table 61 indicates that the mobile station has moved to a new location area, the watch is also transferred to that area by notifying the monitor probes in that location area, the probes 40 in the old location area being stood down.

In order to facilitate the triggering of probe updating in relation to these watch functions, each IMSI entry in the table 61 can conveniently include a field indicating whether the corresponding subscriber is being watched. Whenever a table entry is updated, this field is checked and if this indicates that a watch is being maintained, appropriate probe updating is effected.

Tracking Equipment Identity Codes

The techniques described above may be extended to track identifiers of the equipment used instead of, or in addition to, identifiers of the subscribers using the equipment.

In a mobile communications system each handset is allocated an equipment identity. Owing to variations between handset manufacturers, and variations in the manufacturing process within handset manufacturers, network operators need to identify individual handsets or batches of handsets which for example are not performing as expected, or as a precaution to detect fraudulent usage of multiple handsets claiming to have the same equipment identity.

In the case of GSM, each handset is allocated an International Mobile Equipment Identity (IMEI). Thus, whereas the IMSI and/or TMSI identify the user of the handset, the IMEI identifies the handset itself. Each transaction between the mobile station and the network involves the use of an IMSI, a TMSI or an IMEI.

In general, an IMEI can be tracked by monitoring all the signalling on the GSM Abis interface and noting when IMEIs are used. Whenever an IMEI is found, the rest of the transaction between the mobile station and the BTS is checked to see if either an IMSI or TMSI is also used. In this way the IMEI can be associated with an IMSI and/or a TMSI.

It is necessary to associate the IMEI with the currently used IMSI and/or TMSI because the IMEI is not used in every transaction between the mobile station and the network. On occasions where the IMEI is not used in a transaction, either the currently associated IMSI or TMSI can be tracked during that transaction, as described above, and used if required to establish the identity of the handset.

In the case of a CM Service Request, for example, the mobile station initially identifies itself to the network using the IMSI or TMSI. The network then asks for the IMEI in an Identity Request. The Channel Number parameter is used to link messages relating to the same transaction, as described above in relation to the 'Second Embodiment'.

Figure 9:
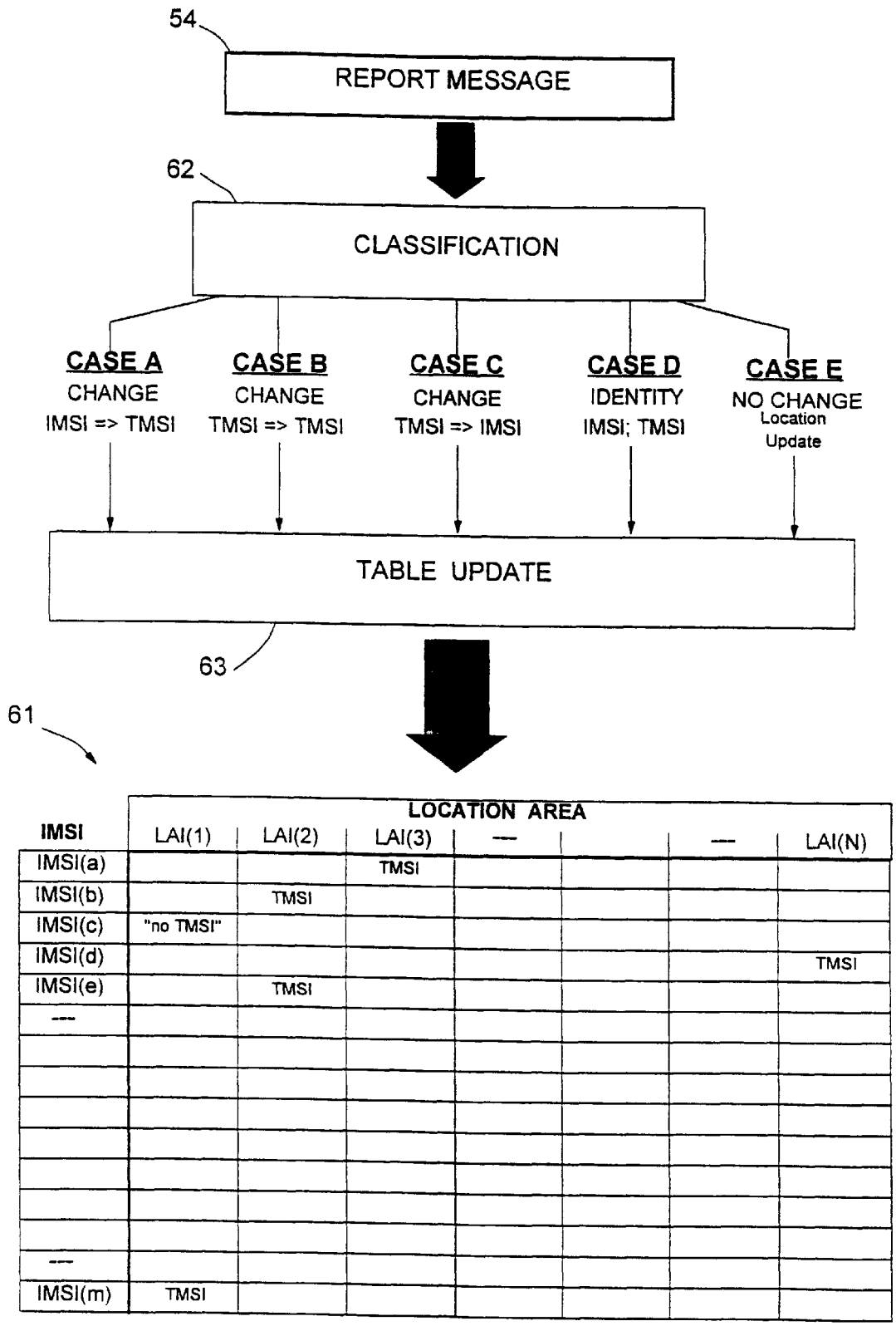
FIG. 9 is a diagram illustrating the processing of report messages received from monitor probes to update a table associating IMSIs with corresponding TMSIs.

The table shown in FIG. 9, used to note the TMSIs currently associated with the currently used IMSIs, is extended to associate each currently used IMEI with each current IMSI and any corresponding TMSI. In effect this is accomplished by adding a third dimension to the table of FIG. 9, with different detected IMEIs being listed along this third dimension. The table entries are updated as new IMSI/TMSI/IMEI correspondences are discovered and as current correspondences disappear, so that for each known IMSI/IMEI pairing, there is an entry giving by location area the current operative TMSI, if any, corresponding to that IMSI/IMEI pairing.

An IMSI or TMSI may be sent in a number of different Initial Layer 3 messages, depending on the procedure taking place. The procedures in the following list use an Initial Layer 3 message and allow Identity Request signalling to be used within the procedure:

in a Mobile Originated call the IMSI or TMSI is sent in a CM Service Request Message;
in a Mobile Terminated call the IMSI or TMSI is sent in a Paging Response Message;
in a call re-establishment the IMSI or TMSI can be sent in a CM-Reestablishment request message; and
in a Location Update the IMSI or TMSI can be sent in a Location Updating Request message.

The IMSI/TMSI used in the above procedures needs to be stored for the length of the procedure, in case an Identity Request/Response signaling exchange happens during the procedure. This Identity Request/Response signaling exchange can happen at any time during the transaction between the mobile station and the BTS.

Under normal circumstances no transactions can take place between the mobile station and the BTS unless the handset has a SIM card inserted. Thus, the IMSI/TMSI is normally used in any transactions to identify the user to the network. However, GSM allows a user to make a call to the emergency services using a handset with no SIM inserted. In this case the handset uses its IMEI in the CM Service Request message sent to the network. Generally, this is the only case when the IMEI is used in the Initial Layer 3 message.

Another method of obtaining the IMEI is to use the GSM identity known as an International Mobile Equipment Identity with Software Version number (IMEISV). This number is essentially the IMEI with an extra field containing the version number of the software controlling operation of the handset. The Cipher Mode Command message sent from the BSC to the BTS can ask for the IMEISV to be sent from the mobile station to the network. In response the IMEISV is sent from the mobile station to the network in a Cipher Mode Complete message. This Cipher transaction can take place in any twoway communication between the mobile station and the network.

Variants

Various modifications are, of course, possible to the above described method for tracking identity-code changes. For example, the table 61 could be split into subtables, one for each location area or association means other than a table data structure could be used to associate an IMSI with the current corresponding TMSI. Again, rather than explicitly looking for connection release messages to trigger removal of the connection records 54, provided the SCCP local references were made unique over a given time period greater than the maximum expected duration of a transaction, the removal of a record could be arranged to occur after a predetermined interval less than said given time period but longer than the usual maximum connection duration (in fact, having a time out for record removal may, in any case, be a useful housekeeping measure).

In certain circumstances the initial correlation between a user's IMSI and the current TMSI can be established from the contents of a BSSMAP Paging Request message, which is transmitted by the PLMN to locate a mobile station to which an incoming call is to be connected. This Paging Request message usually contains both the IMSI and the current TMSI, and thus readily enables their association to be identified.

Although in the above-described embodiments of the identity-tracking apparatus signalling messages relating to the same transaction have been related through a single parameter value (a SCCP end reference for the first embodiment and channel number for the second embodiment), it will be appreciated that in suitable cases different parameters or combinations of parameters could be used.

With regard to tracking across handovers, it will be appreciated that rather than having the central station 42 carry out the correlation process, each monitor 40 can be arranged to carry out this correlation for its new SCCP connections (A interface) or channel numbers (Abis interface); in this case, each monitor 40 will send out Correlation Old messages to all other monitors and the Correlation New and Correlation Complete messages will no longer be required.

The identity tracking method can, of course, be applied to any appropriate cellular radio system and is not restricted in application to GSM-type systems. Indeed, the tracking method can be applied to other types of communications system where identity codes and temporary identity codes are employed. Changes in identity code could be initiated from the user rather than from the communication network though in this case appropriate precautions would need to be taken to preserve uniqueness.

One possible application of the tracking method to a system other than a mobile system is to monitoring Internet-originating traffic passing into a PSTN; due to the insecure nature of the Internet, there may be a need for temporary identities to be assigned in the same way as for mobile systems and in this case the present tracking method would be of value in tracking user identity.

We claim:

1. A method of tracking identity-code changes in a communications system in which a plurality of user stations can simultaneously conduct respective communication transactions during which signalling messages are exchanged with operational elements of the remainder of the communication system over at least one signalling path of a signalling subsystem of said communications system, said signalling messages including first messages sent by said user stations and each including an identity code associated with the user station sending that message, and second messages specifying corresponding identity codes for particular user stations; said method comprising the steps of:

(a) monitoring said signalling subsystem to detect said first message in passage from a user station to said remainder of the communications system;

(b) extracting from the said first message detected in step (a), said identity code included therein, the extracting effected independently of an operational element to which said first message is being sent;

(c) further monitoring said signalling subsystem to detect a said second message related to the same communication transaction as the first message detected in step (a) and passing to/from the same user station;

(d) extracting from said second message detected in step (c), said identity code included therein, said extracting effected independently of the user station/operational element to which the second message is being sent; and (e) associating the identity code extracted in step (b) with the identity code extracted in step (d) thereby to indicate correspondence therebetween.

2. A method according to claim 1, wherein step (c) involves detecting signalling messages relating to the said same communication transaction by looking on a specific said signalling path for signalling messages that have at least one particular parameter value which is at least temporarily characteristic of said same communication transaction on said specific signalling path, said at least one particular parameter value being determined from at least one signalling message previously detected on said specific signalling path as related to said same communication transaction, and said specific signalling path being at least initially the signalling path on which said first message is detected in step (a).

3. A method according to claim 2, wherein said at least one particular parameter value is at least initially extracted from said first signalling message detected in step (a).

4. A method according to claim 2, wherein step (c) further involves detecting any change in signalling path carrying said signalling messages related to said same communication transaction, said specific signalling path corresponding to the signalling path currently detected as carrying these signalling messages.

5. A method according to claim 2, wherein said at least one particular parameter value is the same for all signalling messages that appear on said specific signalling path and relate to said same communication transaction.

6. A method according to claim 5, wherein a connection-oriented service is established across a said signalling path in respect of each said communication transaction handled thereby, said at least one particular parameter value being an end point reference for said connection-oriented service.

7. A method according to claim 6, wherein said communications system is a mobile radio system of the GSM type, each said at least one signalling path being across an A interface and each said connection-oriented service being provided by an SCCP connection.

8. A method according to claim 2, wherein said at least one particular parameter value characteristic of said same communication transaction is subject to change in response to a said signalling message on said specific signalling path, step (c) further involving:

detecting any change in said at least one particular parameter value by detecting the said signalling message provoking that change, and using the latest detected value of said at least one particular parameter value in looking for further signalling messages on said specific signalling path that relate to said same communication transaction.

9. A method according to claim 8, wherein said communications system is a mobile radio system of the GSM type, each said at least one signalling path being across an Abis interface and said at least one particular parameter value being a channel identifier for identifying the radio channel associated with the transaction.

10. A method according to claim 1, wherein said communications system is a mobile radio network in which users have respective unique identity codes and said user stations are mobile stations that communicate over radio channels with a fixed network part forming said remainder of the communications system, said identity code included in a said first message being one of:

the said unique identity code of a user associated with the said user station sending that first message; and a temporary identity code assigned by a said second message sent to said user station.

11. A method according to claim 2, including the step of generating a record for said specific signalling path associating the identity code extracted in step (a) with the current said at least one parameter value characteristic of said same communication transaction on said specific signalling path, step (d) involving associating the identity code specified in the second message with said record.

12. A method according to claim 11, comprising the further step of monitoring said specific signalling path to detect termination of said same communication transaction and thereupon removing said record.

13. A method according to claim 1, wherein said signalling subsystem has a plurality of said signalling paths, said method involving carrying out steps (a) and (c) for at least some of these signalling paths, and the operation in step (d) of recording said identity code corresponding to the identity code extracted in step (b), involving generating a report including both these identity codes and sending this report to a station, this station being the same for all monitored signalling paths.

14. A method according to claim 10, wherein the operation in step (d) of recording said identity code corresponding to the identity code extracted in step (b), involves using these identity codes to maintain association means associating monitored said unique identity codes with the corresponding current said identity codes.

15. A method according to claim 10, wherein said signalling subsystem has a plurality of said signalling paths, said method involving carrying out steps (a) and (c) for at least some of these signalling paths, and the operation in step (d) of recording said identity code corresponding to the identity code extracted in step (b), involving:

generating a report including both these identity codes and sending this report to a station, this station being the same for all monitored signalling paths;

receiving said reports at said station and using the identity codes included therein to maintain association means associating said unique identity codes reported to the station with the corresponding current said identity codes.

16. A method according to claim 10, wherein the coverage of said mobile radio network extends over a plurality of location areas, said temporary identity codes being assigned uniquely within each such area and certain of said signalling messages sent by said user stations including location information identifying the location area in which the user stations are respectively located; said method including the step of monitoring said signalling subsystem to identify from said certain signalling messages the current location area of the user stations partaking in said communication transactions, and where the corresponding identity code recorded in step (d) is a said temporary identity code, recording the location area of the corresponding user station along with that corresponding identity code.

17. A method of monitoring usage behaviour of a particular user of a mobile radio network, said method involving:

(i) tracking identity-codes changes in accordance with the method of claim 14;

(ii) starting with the said unique identity code of said particular user, identifying from said association means the corresponding current identity code of that user; and (iii) monitoring said signalling subsystem to detect first messages including the said corresponding current identity code identified in step (ii), and recording predetermined parameters of the communication transactions of which these first messages form a part.

18. A method according to claim 1, wherein said communications system is a mobile radio network in which said user stations are mobile stations which have respective unique identity codes and which communicate over radio channels with a fixed network part forming said remainder of the communications system, one of said identity codes included in said first and second messages being said respective unique identity code for a mobile station.

19. Apparatus for tracking identity-code changes in a communications system in which a plurality of user stations can simultaneously conduct respective communication transactions during which signalling messages are exchanged with operational elements of the remainder of the communication system over at least one signalling path of a signalling subsystem of said communications system, said signalling messages including first messages sent by said user stations and each including an identity code associated with the user station sending that message, and second messages specifying corresponding identity codes for particular user stations; said apparatus comprising:

first monitoring means for monitoring said signalling subsystem to detect said first message, in passage from a user station to said remainder of the communications system;

first extracting means for extracting from a said first message detected by said first monitoring means, the said identity code included therein, second monitoring means for further monitoring said signalling subsystem to detect a said second message related to the same communication transaction as said first message detected by said first extracting means and passing to/from the same user station, and second extracting means for extracting from a said second message detected by said second monitoring means, the identity code specified in that second message as the identity code corresponding to the identity code extracted by the first extraction means and means for associating the identity code extracted by the first extracting means with the identity code extracted by the second extracting means to thereby indicate their correspondence, said apparatus being functionally independent off said user stations and said operational elements of the communications system.

* * * * *